US006775369B1

(12) United States Patent
McClung

(10) Patent No.: US 6,775,369 B1
(45) Date of Patent: Aug. 10, 2004

(54) SYSTEM AND METHOD FOR ESTABLISHING ROAMING LINE NUMBERS

(75) Inventor: Michael H. McClung, Alexandria, VA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/441,689

(22) Filed: Nov. 16, 1999

(51) Int. Cl.$^7$ ................................................ H04M 3/42
(52) U.S. Cl. ............................ 379/211.04; 379/211.02; 379/212.01; 370/357; 370/353
(58) Field of Search .......................... 379/156, 201.05, 379/201.07

(56) References Cited

U.S. PATENT DOCUMENTS

| | | | | |
|---|---|---|---|---|
| 4,876,707 A | | 10/1989 | Hashimoto | 340/7.21 |
| 5,197,096 A | * | 3/1993 | Sakuma et al. | 379/207.13 |
| 5,742,905 A | | 4/1998 | Pepe et al. | 455/461 |
| 5,809,128 A | | 9/1998 | McMullin | 379/215.01 |
| 5,862,207 A | * | 1/1999 | Aoshima | 379/201.05 |
| 5,963,864 A | | 10/1999 | O'Neil et al. | 455/445 |
| 6,282,275 B1 | | 8/2001 | Gurbani et al. | 379/142.17 |
| 6,304,565 B1 | | 10/2001 | Ramamurthy | 370/352 |
| 6,327,267 B1 | | 12/2001 | Valentine et al. | 370/466 |
| 6,327,358 B1 | | 12/2001 | March et al. | 379/221.01 |
| 6,359,892 B1 | * | 3/2002 | Szlam | 370/401 |
| 6,421,339 B1 | | 7/2002 | Thomas | 370/352 |
| 6,421,437 B1 | | 7/2002 | Slutsman | 379/201.02 |
| 6,445,682 B1 | | 9/2002 | Weitz | 370/257 |
| 6,445,694 B1 | | 9/2002 | Swartz | 370/352 |
| 6,449,269 B1 | | 9/2002 | Edholm | 370/352 |
| 6,453,034 B1 | | 9/2002 | Donovan et al. | 379/220.01 |
| 6,480,484 B2 | | 11/2002 | Morton | 370/352 |
| 6,515,997 B1 | | 2/2003 | Feltner et al. | 370/401 |
| 6,519,252 B2 | | 2/2003 | Sallberg | 370/356 |
| 6,526,033 B1 | | 2/2003 | Wang et al. | 370/338 |
| 6,532,286 B1 | | 3/2003 | Burg | 379/209.01 |

OTHER PUBLICATIONS

Cisco Systems, Inc.; "System Description for the Cisco Communications Network Version 2.1;" Cisco Communications Network; all, 1997.

* cited by examiner

Primary Examiner—Jack Chiang
Assistant Examiner—Karen Le
(74) Attorney, Agent, or Firm—Baker Botts L.L.P.

(57) ABSTRACT

A method is provided for establishing a roaming line number in a communication network. The method includes receiving information from a telephony device indicating a desire to program a roaming line number for the telephony device. The method also includes associating the roaming line number with a network address of the telephony device such that calls placed to the roaming line number will be directed to the telephony device.

34 Claims, 3 Drawing Sheets

| LINE # | IP ADDRESS |
|---|---|
| 1001 | 150.100.50.1 |
| 1002 | 150.100.50.2; 150.100.50.1 |
| 1003 | 150.100.50.3; 150.100.50.1 |
| 1004 | 150.100.50.4 |
| 1005 | 150.100.50.5 |
| 2001 | 150.200.30.1; 150.100.50.4 |
| 2002 | 150.200.30.2 |
| 2003 | 150.200.30.3 |

SYSTEM AND METHOD FOR ESTABLISHING ROAMING LINE NUMBERS

TECHNICAL FIELD OF THE INVENTION

This invention relates generally to the field of telecommunications, and more specifically to a system and method for establishing roaming line numbers.

BACKGROUND OF THE INVENTION

Historically, telecommunications have involved the transmission of voice and fax signals over a network dedicated to telecommunications, such as the Public Switched Telephone Network (PSTN) or a Private Branch Exchange (PBX). Similarly, data communications between computers have also historically been transmitted on a dedicated data network, such as a local area network (LAN) or a wide area network (WAN). Currently, telecommunications and data transmissions are being merged into an integrated communication network using technologies such as Voice over Internet Protocol (VoIP). Since many LANs and WANs transmit computer data using Internet Protocol (IP), VoIP uses existing technology to transport voice and fax signals by converting these signals into digital data and encapsulating the data for transmission over an IP network. Because of the integration of IP telephony devices and data networks, many innovative features may be possible for users of VoIP (and other voice/data integration technologies) that have not been available to users of traditional telecommunication networks.

SUMMARY OF THE INVENTION

In accordance with the present invention, a system and method for establishing roaming line numbers is provided that substantially eliminates or reduces disadvantages or problems associated with previously developed systems and methods. In particular, the present invention contemplates a roaming line number feature that allows a user to dynamically reassign line numbers to various telephony devices in a communications network.

In one embodiment of the present invention, a method is provided for establishing a roaming line number in a communication network. The method includes receiving information from a telephony device indicating a desire to program a roaming line number for the telephony device. The method also includes associating the roaming line number with a network address of the telephony device such that calls placed to the roaming line number will be directed to the telephony device.

In another embodiment of the present invention, a telephony device is provided for programming roaming line numbers. The telephony device includes a roaming line button that, when activated, invokes a roaming line programming session. The telephony device also includes a user interface operable to receive a roaming line number specified by a user during the roaming line number session. The telephony device further includes a network interface coupled to the user interface and operable to communicate the roaming line number to a call manager for association of the roaming line number with a network address of the telephony device.

In yet another embodiment of the present invention, a call manager is provided for associating a network address of a telephony device with a roaming line number. The call manager includes a memory operable to store a mapping table associating one or more line numbers with one or more network addresses of a telephony device. The call manager also includes a network interface operable to receive a request from a telephony device to associate a roaming line number with the telephony device. The call manager further includes a processor coupled to the memory and the network interface. The processor is operable to modify the memory to associate a network address of the telephony device with the roaming line number.

Technical advantages of the present invention include a system and method that allow line numbers to be dynamically associated with different telephony devices by users of the telephony devices. Using the present invention, a user can temporarily assign a particular line number to a telephony device so that the user can receive incoming calls to that line number at the telephony device. These temporarily assigned line numbers may be referred to as roaming line numbers. A user can also set an expiration period after which the roaming line number will be canceled. Furthermore, the user can generate roaming line numbers at the particular telephony device at which the user wants to receive calls. Therefore, it is not necessary for the user to "forward" telephone calls from the telephony device to which the line number is regularly assigned. It is also not necessary for a system administrator to make the temporary assignment.

Further technical advantages of the present invention include the capability of either blocking the assignment of certain line numbers to other telephony devices or requiring a password to reassign certain line numbers. The present invention also incorporates features such as audio voice prompts or an interactive voice response system that allow a user to easily interact with a call manager that is responsible for reassigning the line numbers according to the user's instruction. Other technical advantages are readily apparent to one skilled in the art from the following figures, descriptions, and claims.

BRIEF DESCRIPTION OF THE DRAWINGS

For a more complete understanding of the present invention, and for further features and advantages, reference is now made to the following description, taken in conjunction with the accompanying drawings, in which.

DETAILED DESCRIPTION OF THE INVENTION

Figure 1:
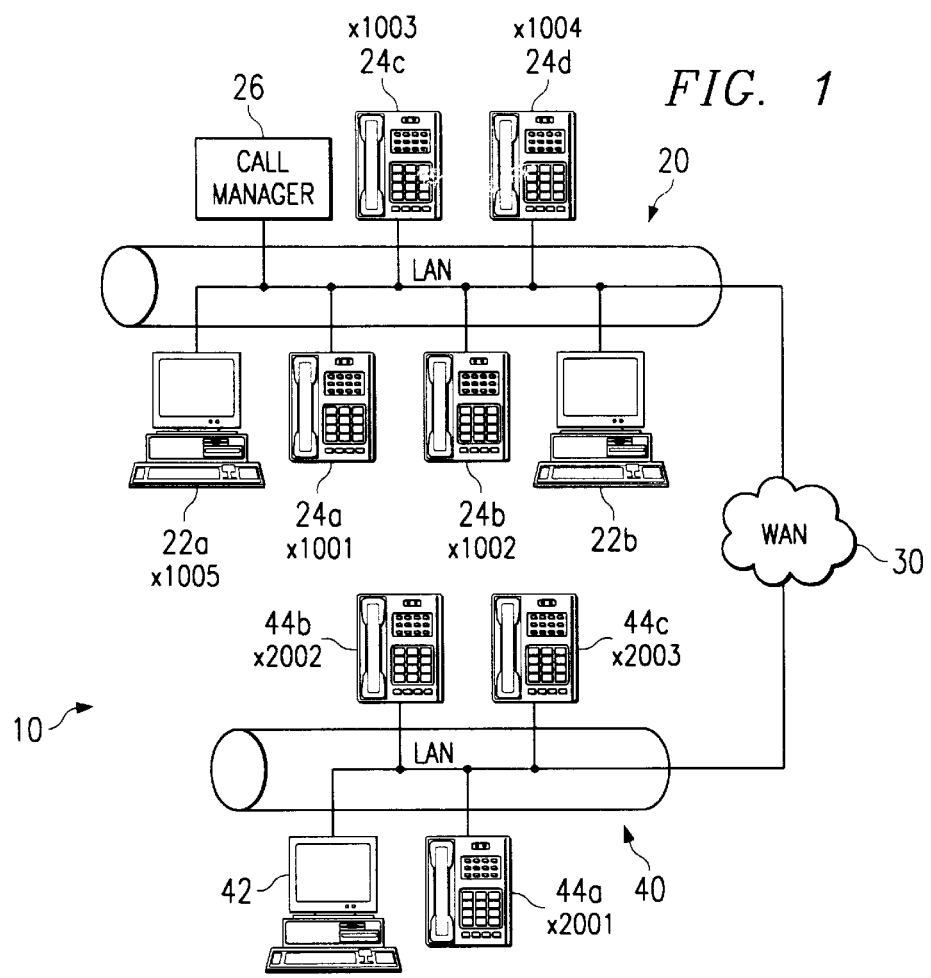
FIG. 1 illustrates an exemplary communication network in accordance with the present invention.

The present invention contemplates a roaming line number feature that allows a user to dynamically reassign line numbers to various telephony devices in a communications network. FIG. 1 illustrates an exemplary communication network 10 in which this roaming line number feature is implemented. Although a specific communication network is illustrated in FIG. 1, the term "communication network" should be interpreted as generically defining any network capable of communicating telecommunication signals, data, and/or messages.

In the illustrated embodiment, communication network 10 includes a plurality of local area networks (LANs) 20, 40 interconnected using a wide area network (WAN) 30. Each LAN 20, 40 is a computer data network that is further operable to transmit audio and/or video signals. In the particular embodiment illustrated in FIG. 1, LANs 20, 40 are Internet Protocol (IP) networks. However, LANs 20, 40 may be any type of network that allows the transmission of audio and/or video signals, as well as traditional data communications. Therefore, although subsequent description will primarily focus on IP telephony devices, it should be understood that other appropriate telephony devices, such as Voice over Frame Relay or Voice over ATM (Asynchronous Transfer Mode) devices, are also included within the scope of this description.

LANs 20, 40 may be coupled to other IP networks including, but not limited to, WAN 30 and any IP networks coupled to WAN 30 (such as other LANs or the Internet). Since all IP networks share a common method of transmitting data, telecommunication signals can be transmitted between telephony devices located on different, but interconnected, IP networks. In addition to being coupled to other IP networks, LANs 20, 40 may also be coupled to non-IP telecommunication networks through the use of gateways. For example, LANs 20, 40 may be coupled to a private branch exchange (PBX) and/or the Public Switched Telephone Network (PSTN). The gateways provide the necessary translation between the data transmission formats of IP networks and non-IP networks.

IP networks transmit data (including voice and video data) by placing the data in packets and sending each packet to the selected destination. Unlike a circuit-switched network (like the traditional PSTN), dedicated bandwidth is not required for the duration of a call or fax transmission over LANs 20, 40 and WAN 30. Instead, each telephony device sends packets across the network as they become available for transmission. This feature makes bandwidth available for other data when voice or fax data is not being transmitted.

The technology that allows telecommunications to be transmitted over an IP network may be referred to as Voice over IP (VoIP). IP telephony devices 22, 24 are coupled to LAN 20 to allow such communication over LAN 20. IP telephony devices 22, 24 have the capability of encapsulating a user's voice (or other inputs) into IP packets so that the voice can be transmitted over LAN 20 or other IP networks. IP telephony devices include telephones 24, fax machines, computers 22 running telephony software (such as MICROSOFT NETMEETING or virtual telephone software), or any other device capable of performing telephony functions over an IP network.

An IP telephony device typically resembles a traditional digital PBX telephony device, but instead of connecting to a proprietary PBX port, the telephony device plugs into a LAN jack, such as an Ethernet jack. For example, an IP Ethernet telephony device plugs directly into an Ethernet RJ45 jack, as opposed to a traditional RJ11 telephone jack. Alternatively, a user may plug a handset or headset directly into a personal computer 22 on LAN 20 to form a virtual IP telephony device. An IP telephony device operates as a standard IP network device and typically has its own IP address (note that an IP telephony device can also support multiple IP addresses). IP telephony devices may have the ability to handle data coding and decoding at the telephony device. The telephony device may also switch compression schemes on demand, such as switching between G.711 and G.723 compression.

A call manager 26 controls IP telephony devices 22, 24. Call manager 26 is an application that controls call processing, routing, telephone features and options (such as call hold, call transfer and caller ID), device configuration, and other telephony functions and parameters within communication network 10. Call manager 26 can control all of the IP telephony devices 22, 24 on LAN 20, and it can also control IP telephony devices 42, 44 located across WAN 30 on LAN 40. Alternatively, a second call manager can be located on LAN 40.

When a user wishes to place a call from an IP telephony device on LAN 20 (or LAN 40) to another IP telephony device on LAN 20 (or LAN 40), the calling telephony device transmits a signal to call manager 26 indicating the desired function and the telephony device to be called. Call manager 26 then checks on the availability of the called telephony device and, if available, sets up the call by instructing the calling party (the originating telephony device) to set up an audio stream with the called party (the target telephony device). The initial signaling between call manager 26 and either the originating telephony device or the target telephony device is transmitted over LAN 20 (and, if necessary, WAN 30 and LAN 40) using, for example, a Transmission Control Protocol (TCP).

The TCP layer in the transmitting telephony device divides the data to be transmitted into one or more packets, numbers the packets, and then forwards them individually to the IP network layer for transmission to the destination telephony device. Although each packet has the same destination IP address, the packets may travel along different paths to reach the intended destination. As the packets reach the destination telephony device, the TCP layer reassembles the individual packets and ensures that they all have arrived. Once TCP reassembles the data, it forwards the data to the destination telephony device as a single message.

After call manager 26 initiates the call with signaling via TCP, audio streaming between the telephony devices begins. A codec (coder/decoder) in the telephony device converts the voice, video or fax signals generated by the users of the telephony devices from analog signals into digital form. The codec can be implemented either in software or as special-purpose hardware in IP telephony devices 22, 24. As the user speaks into the handset or other audio input device, the codec converts the analog voice signals into digital data. The digitally encoded data is then encapsulated into IP packets so that it can be transmitted over LAN 20, WAN 30 and/or LAN 40.

The encapsulation is performed by Real-Time Transport Protocol (RTP) running over UDP (User Datagram Protocol) or any other suitable communication protocol. As with TCP, UDP uses the Internet Protocol to communicate data packets from one computer to another. Unlike TCP, however, UDP does not provide sequencing and error-checking of the arriving packets. However, since UDP does not perform these functions, UDP operates faster than TCP and is useful when speed is more important than accuracy. This is true of audio and video streaming since it is critical that the data be transmitted as quickly as possible, but it is not critical that every single packet is reassembled correctly (either its absence is negligible or the destination telephony device can extrapolate its contents). Once UDP has received and reassembled the IP packets at the destination telephony device, a codec in the destination telephony device translates the digital data into analog voice signals for presentation to the user. The entire process is repeated each time any call participant (or any other source) generates an audio, video, or fax signal.

When a call is placed to an IP telephony device (e.g., telephony device 24a), the originating telephony device (e.g., telephony device 24b) sends a call initiation request to call manager 26 indicating a desire to set up a telephone call with telephony device 24a. Once call manager 26 receives the request, call manager 26 sends a signal to telephony device 24a offering the call to the telephony device. If telephony device 24a can accept the call (e.g., it is not in use or under a Do Not Disturb instruction from the user), telephony device 24a replies to call manager 26 that it will accept the call. Upon receiving this acceptance, call manager 26 transmits a signal to telephony device 24a to cause it to ring. The telephony device's user can then hear the ring and can take the telephony device "off-hook" to receive the call. Taking the telephony device off-hook may include, but is not limited to, picking up a handset, pressing the ringing line's button, pressing a speakerphone button, or otherwise manually or automatically indicating that the telephony device is ready to receive the incoming call. For the purposes of this application, the term "off-hook" is used to generically indicate a condition of a telephony device when it is ready to initiate or receive telecommunication signals. Once telephony device 24a has been taken off-hook, call manager 26 establishes an RTP audio and/or video stream between telephony devices 24a and 24b.

Figure 2:
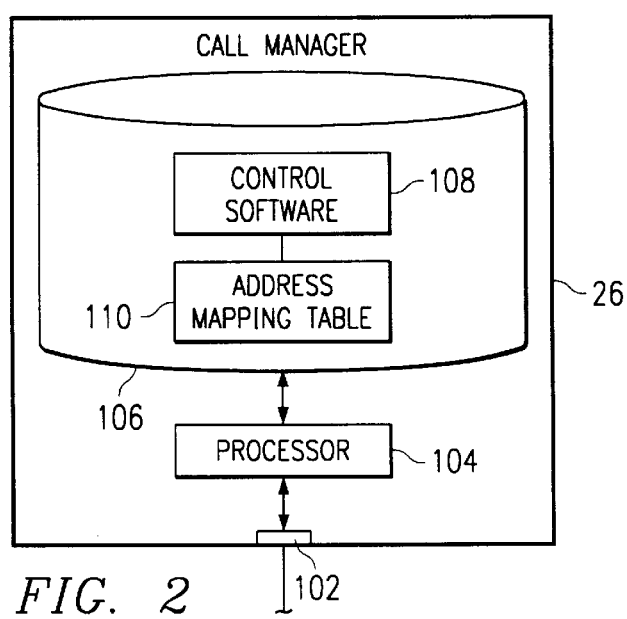
FIG. 2 illustrates an exemplary call manager in the communication network.

FIG. 2 illustrates an exemplary call manager 26. Call manager 26 includes a network interface 102 that receives data from and transmits data to LANs 20, 40. Network interface 102 is any electrical, physical, electromagnetic, or wireless connection enabling call manager 26 to be coupled to network 10. One example of network interface 102 is an RJ45 interface, which is typically used in an Ethernet network. Call manager 26 also includes a processor 104 and a memory 106 that is accessible by processor 104. Memory 106 includes any type of volatile or non-volatile computer memory such RAM (or its variants), Flash, ROM, PROM, EPROM, EEPROM, or any other appropriate device for storing data. Memory 106 also includes media storage devices including, but not limited to, hard drives, diskettes, CD-ROMs, DVD-ROMs, or other optical or magnetic storage devices.

Memory 106 contains telephony control software or firmware 108 that provides the various telephony functions needed to control IP telephony devices. Examples of these functions include, but are not limited to, network interfacing, IP tasks (e.g., a TCP/IP stack), telephony device set-up and configuration, call set-up, and Web-based administration and help services. It should be noted that although the term "call manager" has been used to refer to a complete computer system running telephony control software, the term also refers only to the control software. A dedicated computer is not needed to run the call manager control software. For example, the software can be loaded on an existing computer, such as a server, on the IP network. Alternatively, the call manager function can be distributed throughout each LAN 20 on the various IP telephony devices. The call manager software may be embodied in any type of computer-readable medium including, but not limited to, hard drives, diskettes, CD-ROMs, DVD-ROMs, or other optical or magnetic storage devices.

Figures 3, 4:
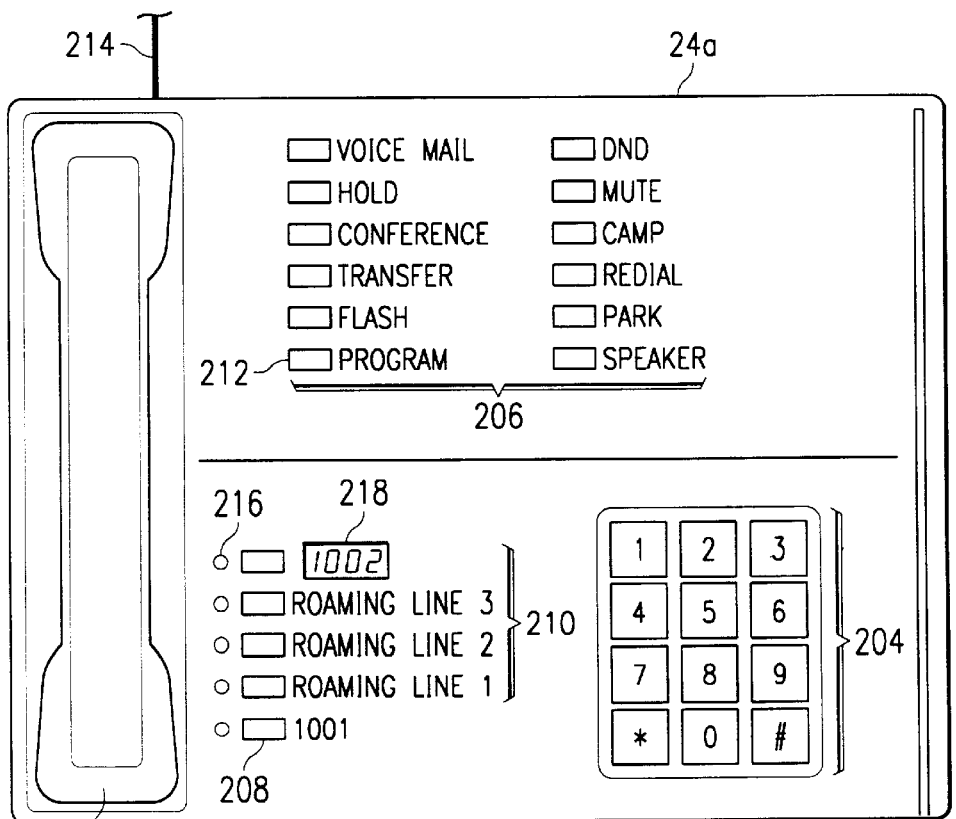
FIG. 3 illustrates an exemplary address mapping table maintained by the call manager.
FIG. 4 illustrates an exemplary telephony device implementing a roaming line number feature in the communication network.

Memory 106 also contains an address mapping table 110. Using control software 108, processor 104 accesses table 110 to set up calls between telephony devices and to create roaming line numbers (described in detail below). An exemplary mapping table 110 is illustrated in FIG. 3. In general, mapping table 110 translates the signaling protocol of a first network into the signaling protocol of a second network. In a particular embodiment, call manager 26 uses mapping table 110 to translate a telephony device line number into a network address, such as an IP address, although any other appropriate network address may be used. The translation is employed since an IP network transmits information to a device based on its IP address, not based on a telephone number (unlike the PSTN). Mapping table 110 includes at least two sets of data entries. The first set of entries includes the telephony device line numbers or extensions 112. The second set of entries includes one or more IP addresses 114 of one or more IP telephony devices associated with each line number 112.

When an IP telephony device is connected to LAN 20, the telephony device initially registers with call manager 26 using its Media Access Control (MAC) address. The MAC address is a hardware address that uniquely identifies each node of a network and informs call manager 26 where an IP telephony device is physically located on LAN 20. The telephony device also typically sends a message to call manager 26 to inform call manager 26 of the telephony device's line number (or call manager 26 may assign a line number). Furthermore, in order to promote device mobility, once a telephony device is connected to LAN 20, call manager 26 dynamically assigns the telephony device an IP address using Dynamic Host Control Protocol (DHCP) or another similar protocol or technique. This IP address is associated with the MAC address of the device.

Once call manger 26 has assigned an IP address to the telephony device, call manager 26 adds the IP address to mapping table 110 and associates the IP address with the telephony device's line number in mapping table 110. This association allows call manager to signal a telephony device in response to an incoming call to a particular line number. Although the line numbers shown in mapping table 110 for telephony devices 22, 24 are four-digit internal extension numbers, the line numbers for these telephony devices may also be full North American Numbering Plan (NANP) telephone numbers that identify the telephony devices to callers outside of LANs 20, 40 (such as callers on the PSTN).

One important advantage of network 10 is the ability to assign line numbers to different IP telephony devices based on the needs of the user. One feature that may be provided in such a system is a roaming line number capability. A roaming line number feature allows a user to temporarily designate one or more telephony devices (in addition to or instead of the user's regularly assigned telephony device) at which the user can receive incoming calls to a particular line number. As an example, consider telephony device 24b, which has an assigned line number of "1002" that telephony device 24b received when telephony device 24b registered with call manager 26. A user can temporarily receive telephone calls incoming to extension "1002" at telephony device 24a by using the roaming line number feature to program telephony device 24a to receive such calls. When a call is placed to extension "1002", telephony device 24a will ring and the user can take telephony device 24a off-hook to connect the call.

In order to assign a line number to a particular telephony device, call manager 26 temporarily associates the IP or other network address of the telephony device with the temporarily assigned line number in mapping table 110 (alternately, call manager 26 can assign a second IP address to the telephony device to handle calls placed to the temporarily assigned line number). For example, in FIG. 3, line numbers "1002" and "1003" have both been assigned to the IP address of telephony device 24a. Therefore, in mapping table 110 these line numbers have two associated IP addresses: the IP address of the telephony device to which the line number is regularly assigned and the IP address of telephony device 24a to which the line number has been temporarily assigned. Alternatively, the association with the regularly assigned telephony device may be removed from mapping table 110 while the line number is roaming.

Although FIG. 3 only shows a few exemplary assignments of roaming line numbers, any line number managed by call manager 26 can be assigned to any telephony device managed by call manager 26 that has the capability to accept roaming line numbers (including telephony devices on LAN 40 or any other network managed by call manager 26). In addition, although the table of FIG. 3 is shown as associating a single line number with multiple IP address in a single relationship, an alternative arrangement is to have multiple entries of the same line number in the table, each entry being associated with a single (but different) IP address.

FIG. 4 illustrates an exemplary telephony device 24a that includes provisions for implementing roaming line numbers. Telephony device 24a includes a handset 202 and a keypad 204. Telephony device 24a also includes a number of feature buttons 206 that are used to activate various capabilities of telephony device 24a, such as transferring a caller or placing a caller on hold. For the purposes of this application, the term "button" means any type of switch, selection on a computer, or other user input used to indicate the selection of a particular feature of a telephony device. Telephony device 24a further includes a number of line buttons 208, 210 that are used to select the various line numbers assigned to telephony device 24a. These line buttons include one or more fixed line buttons 208 that are associated with fixed line numbers, and one or more roaming line buttons 210 that can be associated with roaming line numbers. Call manager 26 assigns fixed line numbers to a particular telephony device upon registration. Roaming line numbers, as described above, are line numbers that a user temporarily assigns to a particular telephony device.

Using roaming line buttons 210, a user has the ability to dynamically extend incoming telephone calls to different locations. For example, if a user is going to be in the room where telephony device 24a is located, the user can program telephony device 24a to receive the user's incoming telephone calls. The user does this by selecting one of roaming line buttons 210 for programming. Since a programmed roaming line button 210 may operate like fixed line button 208 (e.g., the line is taken off-hook when the button is pressed), selecting a button 210 for programming may be distinguished from selecting a button 210 for operation of the line. This can be accomplished in many ways, including, but not limited to, holding button 210 down for a specified length of time (e.g., three seconds) or pressing a program button 212 before pressing a roaming line button 210. Once a roaming line button 210 has been selected for programming, the user can then interact with call manager 26 using a network interface 214 to program the selected button 210, as described below. Once a user programs a roaming line button 210, an indicator light 216 indicates that button 210 is programmed, and a display 218 indicates the line number that is assigned to button 210. In another embodiment, display 218 may identify the name or initials of the user associated with the programmed line.

Figure 5:
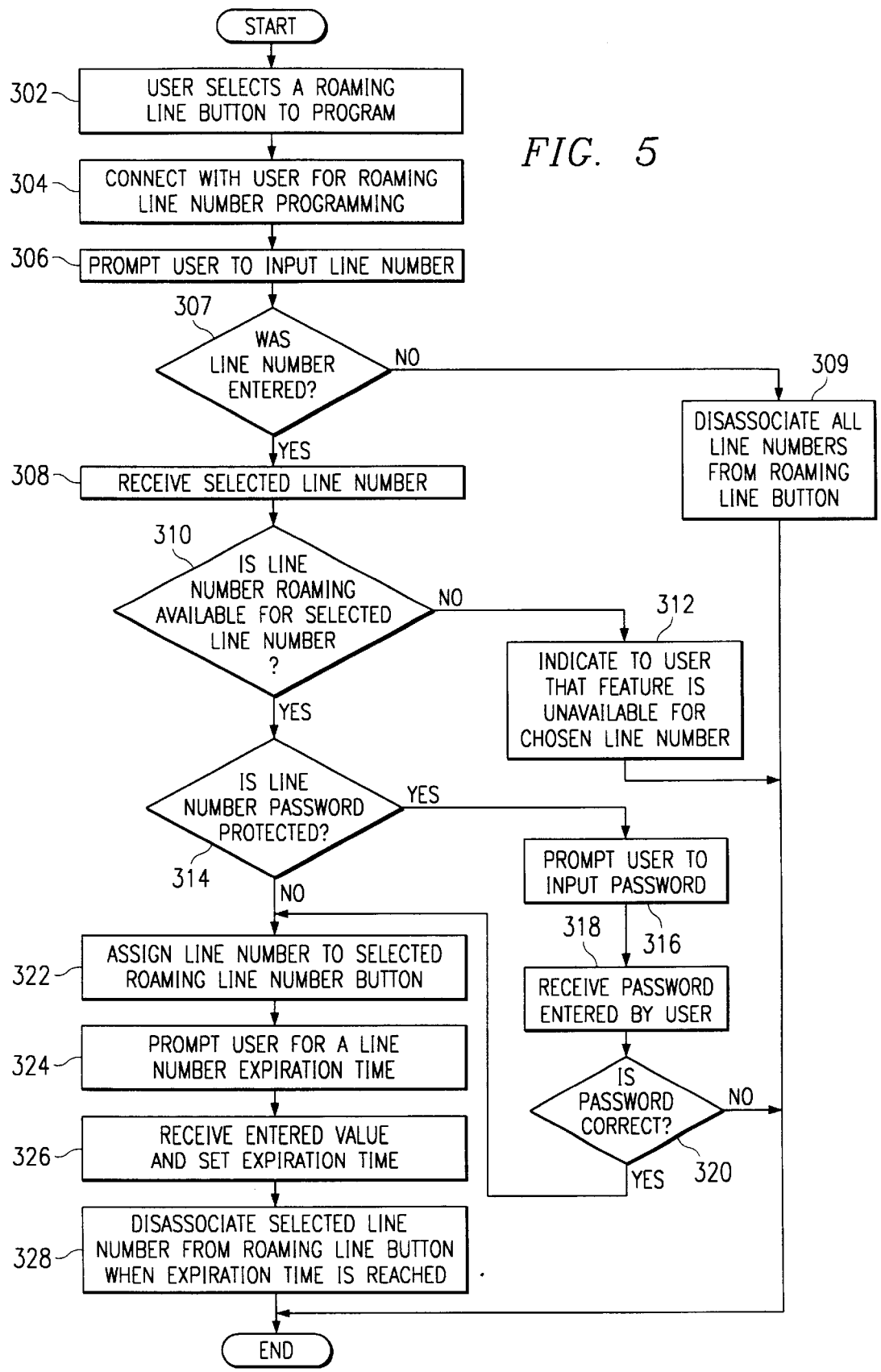
FIG. 5 illustrates a method of assigning a roaming line number in the communication network.

FIG. 5 illustrates a method of assigning a roaming line number at a telephony device. As an example, the method assumes that a user is programming a roaming line button 210 on telephony device 24a. The method starts at step 302 when a user selects a roaming line button 210 to initiate a roaming line programming session. As described above, this selection may involve depressing a single button or a combination of buttons. If telephony device 24a is being programmed through a computer interface (such as a virtual telephony device), selecting a roaming line button 210 may involve "clicking" a button 210 with a mouse. Furthermore, any other appropriate method of indicating a desire to program a roaming line number may also be used.

Once the user has selected a roaming line button 210, call manager 26 interacts with the user at step 304 to enable the user to program a roaming line number. Call manager 26 and the user interact in many ways, including, but not limited to, audio voice prompts, interactive voice response, voice recognition, dual tone multifrequency (DTMF) digits, or a computer interface (including a computer display and a user input device, such as a keyboard or a mouse). Call manager 26 prompts the user to input the line number the user wants to "roam" at step 306. Examples of such a prompt include an audio message requesting the input from the user or a simple tone indicating that call manager 26 is ready to receive the line number. The user responds to the prompt by entering a line number using keypad 204, speaking the line number into headset 202, or any other appropriate method of conveying this type of information. The line number may be a line number that call manager 26 has already assigned to a telephony device, or it may be a new line number.

It should be noted that although the above description discusses an interaction between call manager 26 and the user, this interaction alternatively may be between the user and phone 24a at which the user is programming the roaming line number. In this case, phone 24a would then act as an intermediary between the user and call manager 26. Phone 24a prompts the user for the required information, and once such information is received, phone 24a communicates this information to call manager 26.

A selected period of time after the prompt at step 306, call manager 26 (or phone 24a, as discussed above) either receives the selected line number at step 308 or determines at step 307 that no line number was entered. If no line number was entered, call manager 26 disassociates all previously programmed line numbers, if any, from roaming line button 210 at step 309. This feature enables a user to clear all line numbers from roaming line button 210 without waiting for a previously entered expiration time to run out.

If a selected line number is received at step 308, call manager 26 determines whether line number roaming is available for the selected line number at step 310. A user or system administrator can block a line number from being available for line number roaming to increase security where necessary. For example, the line number for an executive of a company may not be capable of being "roamed" to prevent unauthorized persons from receiving the executive's calls at another telephony device using a roaming line button. The roaming line feature can also be blocked for line numbers that are assigned to users who have no desire or need for this feature. If the roaming line number feature is blocked for the line number selected by the user, call manager 26 indicates that the feature is unavailable at step 312, and the process ends.

If the roaming line feature is available, call manager 26 determines whether the selected line number requires a password to enable the roaming line feature at step 314. Password protection is another method of providing the security described above. If the selected line number is password-protected, call manager 26 (or phone 24a) prompts the user to enter a password at step 316. The user enters the password by selecting keys on keypad 204, speaking the password into handset 202, or any other appropriate method. Call manager 26 receives the password entered by the user at step 318, and call manager 26 determines whether the password is correct at step 320. If the entered password is incorrect, the process ends (or the user may be given another attempt to enter a correct password).

If the entered password is correct, or if no password is required, call manager 26 assigns the selected line number to the selected roaming line button 210 at step 322. Call manager 26 performs this assignment by associating the line number entered by the user with the IP address of telephony device 24a in mapping table 110, as described above. Call manager 26 (or phone 24a) prompts the user at step 324 to enter a time and/or date for the roaming line assignment to expire. The user then enters this expiration period after the prompt. Alternatively, the user may enter no value and a default value will be assigned. Call manager 26 receives the entered expiration period (or determines that no value has been entered) and sets a corresponding expiration date and/or time at step 326. When the entered (or default) expiration period has been reached, call manager 26 disassociates the line number from roaming line button 210 at step 328 by removing the IP address of telephony device 24a from the list of addresses associated with the selected line number in mapping table 110.

A call can be placed to a roaming line number as follows. An originating telephony device, for example telephony device 24d, initiates a call to a target IP telephony device, for example telephony device 24b (extension "1002"), through a call initiation request sent by telephony device 24d to call manager 26. The call initiation request indicates a desire to place a telephony device call to the target telephony device. Call manager 26 receives the call initiation request and determines the line number being called from the call initiation request. Call manager 26 then determines which IP addresses are associated with that line number in mapping table 110. Using mapping table 110 of FIG. 3 as an example, the IP addresses associated with extension "1002" are the regularly assigned IP address of telephony device 24b and the IP address of telephony device 24a that has been temporarily assigned using roaming line button 210 on telephony device 24a.

Call manager 26 directs the call to telephony devices 24a and 24b by signaling these telephony devices to indicate the presence of the incoming call. If either telephony device has more than one line number assigned to it (e.g., if telephony device 24a has other assigned roaming line buttons 210), call manager 26 also signals the telephony device to indicate which line number is being called. Telephony devices 24a and 24b provide an indicator light 216, display 218, a customized ringing tone, or any other suitable indication that a call has been placed to a particular line number. If either telephony device 24a or 24b can accept the call, call manager 26 directs the telephony device(s) to indicate the incoming call. A user can then take the telephony device(s) off-hook to connect the call. Assuming that both telephony devices are ringing (or otherwise indicating the incoming call), once the user takes one of telephony devices 24a or 24b off-hook, call manager 26 stops the ringing at both telephony devices. Call manager 26 then establishes an RTP audio and/or video stream between the originating telephony device and the off-hook telephony device, as described above.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. A method for establishing a roaming line number in a communication network, comprising:

receiving information from a telephony device indicating a desire to program a roaming line number for the telephony device; and associating the roaming line number with a second packet network address of the telephony device, wherein a regularly assigned line number of the telephony device that is different than the roaming line number is associated with a first packet network address of the telephony device at the same time the roaming line number is associated with the second packet network address of the telephony device such that both calls placed to the regularly assigned line number and calls placed to the roaming line number will be directed to the telephony device.

2. The method of claim 1, further comprising:

receiving a user selection of a roaming line button at the telephony device indicating a desire to program a roaming line number, the selection of the roaming line button being received while the telephony device is in an on-hook condition; and receiving the roaming line number to be associated with the roaming line button at the telephony device.

3. The method of claim 2, further comprising issuing voice prompts to a user of the telephony device to enter the roaming line number to be associated with the roaming line button.

4. The method of claim 1, further comprising:

determining whether the roaming line number is available for temporary assignment; and associating the roaming line number with the packet network address of the telephony device if the roaming line number is available for temporary assignment.

5. The method of claim 1, further comprising:

determining whether a password is required to associate the roaming line number with a packet network address of the telephony device;

prompting a user of the telephony device for a password if a password is required;

receiving the password entered by the user;

determining whether the received entered password is correct; and associating the roaming line number with the packet network address of the telephony device if the received password is correct.

6. The method of claim 1, further comprising canceling the association of the roaming line number with the packet network address of the telephony device after a predetermined period of time specified by the user.

7. A method of establishing a roaming line number in a communication network, comprising:

receiving a roaming line number at a telephony device; and communicating, from the telephony device, the roaming line number to a call manager controlling the telephony device to associate the roaming line number with a second packet network address of the telephony device, wherein a regularly assigned line number of the telephony device that is different than the roaming line number is associated with a first packet network address of the telephony device at the same time the roaming line number is associated with the second packet network address of the telephony device such that both calls placed to the regularly assigned line number and calls placed to the roaming line number will be directed to the telephony device.

8. The method of claim 7, further comprising:
generating a voice prompt to enter the roaming line number;
receiving the roaming line number at the telephony device in response to the voice prompt; and
communicating the roaming line number to the call manager.

9. The method of claim 7, further comprising:
generating a prompt to enter a password to associate the roaming line number with the telephony device;
receiving the password at the telephony device in response to the prompt; and
communicating the password to the call manager.

10. The method of claim 7, further comprising:
generating a prompt to enter an expiration period to associate with the roaming line number;
receiving the expiration period at the telephony device in response to the prompt; and
communicating the expiration period to the call manager.

11. A telephony device for programming roaming line numbers, comprising:
a roaming line button that, when activated, invokes a roaming line programming session;
a user interface operable to receive a roaming line number specified by a user during the roaming line number session; and
a network interface coupled to the user interface and operable to communicate the roaming line number to a call manager for association of the roaming line number with a second packet network address of the telephony device, wherein a regularly assigned line number of the telephony device that is different than the roaming line number is associated with a first packet network address of the telephony device at the same time the roaming line number is associated with the second packet network address of the telephony device such that both calls placed to the regularly assigned line number and calls placed to the roaming line number will be directed to the telephony device.

12. The telephony device of claim 11, further comprising an indicator operable to indicate an incoming call to the roaming line number.

13. The telephony device of claim 11, further comprising a display associated solely with the roaming line button, the display operable to display the roaming line number.

14. The telephony device of claim 11, wherein the telephony device is taken off-hook by depressing the roaming line button used to program the roaming line number.

15. The telephony device of claim 11, wherein the user interface comprises a keypad, and the roaming line number is specified by Dual Tone Multi-frequency (DTMF) signals generated in response to the user's depression of keys on the keypad.

16. The telephony device of claim 11, wherein the user interface comprises a voice recognition device, and the roaming line number is specified by the user's voice inputs received by the voice recognition device.

17. The telephony device of claim 11, wherein the user interface comprises a computer display and a user input device, and the roaming line number is specified by user input made using the user input device in response to prompts on the computer display.

18. A call manager for associating a packet network address of a telephony device with a roaming line number, comprising:
a memory operable to store a mapping table associating one or more line numbers with one or more packet network addresses of a telephony device;
a network interface operable to receive a request from a telephony device to associate a roaming line number with the telephony device; and
a processor coupled to the memory and the network interface, the processor operable to modify the memory to associate the roaming line number with a second packet network address of the telephony device, wherein the memory maintains a regularly assigned line number of the telephony device that is different than the roaming line number and that is associated with a first packet network address of the telephony device at the same time the roaming line number is associated with the second packet network address of the telephony device such that both calls placed to the regularly assigned line number and calls placed to the roaming line number will be directed to the telephony device.

19. The call manager of claim 18, wherein the processor is further operable to prompt a user of the telephony device for a password, and to modify the memory to associate a packet network address of the telephony device with the roaming line number if the password received from the user is correct.

20. The call manager of claim 18, wherein the processor is further operable to prompt a user of the telephony device for an expiration period, and to modify the memory to cancel the association of the roaming line number with the packet network address of the telephony device upon expiration of the expiration period received from the user.

21. The call manager of claim 18, wherein:
the network interface is operable to receive a call initiation request from an originating telephony device indicating a desire to communicate with one or more telephony devices at a selected roaming line number;
the network interface is operable to receive a call initiation request from a telephony device assigned a roaming line number to one or more telephony devices over the roaming line number; and
the processor is operable to access the memory to determine the packet network addresses of the telephony devices associated with the selected roaming line number, the processor further operable to initiate a connection between the originating telephony device and the telephony devices associated with the roaming line number.

22. A communication system, comprising:
a packet-based communication network;
a telephony device coupled to the packet-based communication network, the telephony device including:
a roaming line button that, when activated, invokes a roaming line programming session;
a user interface operable to receive a roaming line number specified by a user during the roaming line number session; and
a network interface coupled to the user interface and operable to communicate the roaming line number over the packet-based communication network; and a call manager coupled to the packet-based communication network, the call manager including:
  a memory operable to store a mapping table associating one or more line numbers with one or more packet network addresses of the telephony device; and
  a network interface operable to receive a request from the telephony device to associate a roaming line number with the telephony device; and
  a processor coupled to the memory and the network interface, the processor operable to modify the memory to associate the roaming line number with a second packet network address of the telephony device, wherein the memory maintains a regularly assigned line number of the telephony device that is different than the roaming line number and that is associated with a first packet network address of the telephony device at the same time the roaming line number is associated with the second packet network address of the telephony device such that both calls placed to the regularly assigned line number and calls placed to the roaming line number will be directed to the telephony device.

23. The communication system of claim 22, wherein the telephony device further comprises an indicator operable to indicate an incoming call to the roaming line number.

24. The communication system of claim 22, wherein the telephony device further comprises a display associated solely with the roaming line button, the display operable to display the roaming line number.

25. The communication system of claim 22, wherein the processor of the call manager is further operable to prompt a user of the telephony device for a password, and to modify the memory to associate a packet network address of the telephony device with the roaming line number if the password received from the user is correct.

26. The communication system of claim 22, wherein the processor of the call manager is further operable to prompt a user of the telephony device for an expiration period, and to modify the memory to cancel the association of the roaming line number with the packet network address of the telephony device upon expiration of the expiration period received from the user.

27. Call manager software embodied in a computer-readable medium and operable to perform the following steps:
  receiving information from a telephony device indicating a desire to program a roaming line number for the telephony device; and
  associating the roaming line number with a second packet network address of the telephony device, wherein a regularly assigned line number of the telephony device that is different than the roaming line number is associated with a first packet network address of the telephony device at the same time the roaming line number is associated with the second packet network address of the telephony device such that both calls placed to the regularly assigned line number and calls placed to the roaming line number will be directed to the telephony device.

28. The call manager software of claim 27, further operable to issue a voice prompt to a user of the telephony device to enter the roaming line number to be associated with the roaming line feature.

29. The call manager software of claim 27, further operable to perform the following steps:
  determining whether the roaming line number is available for temporary assignment; and
  associating the roaming line number with the packet network address of the telephony device if the roaming line number is available for temporary assignment.

30. The call manager software of claim 27, further operable to perform the following steps:
  determining whether a password is required to associate the roaming line number with a packet network address of the telephony device;
  prompting a user of the telephony device for a password if a password is required;
  receiving the password entered by the user;
  determining whether the received password is correct; and
  associating the roaming line number with the packet network address of the telephony device if the received password is correct.

31. The call manager software of claim 27, further operable to cancel the association of the roaming line number with the packet network address of the telephony device after a predetermined period of time specified by the user.

32. The communication system of claim 22, wherein the roaming line is taken off-hook by depressing the roaming line button used to program the roaming line number.

33. The telephony device of claim 11, wherein the roaming line is taken off-hook by depressing the roaming line button used to program the roaming line number.

34. The method of claim 7, further comprising placing a call on a roaming line number assigned to a telephony device from that telephony device.

* * * * *